United States Patent Office 3,438,292
Patented Apr. 15, 1969

3,438,292
MACHINE TOOL CONTROL
Donald William Burr, Malvern, England, assignor to Minister of Aviation in Her Britannic Majesty's Government of the United Kingdom of Great Britain and Northern Ireland, London, England
Filed Feb. 7, 1966, Ser. No. 525,491
Claims priority, application Great Britain, Feb. 8, 1965, 5,290/65
Int. Cl. B23b *3/28;* B23c *1/16, 1/18*
U.S. Cl. 82—14                    14 Claims

ABSTRACT OF THE DISCLOSURE

A machine tool includes means for generating an optical signal indicative of a dimension of the workpiece while it is being machined at the part of the workpiece being machined, gauging means, responsive to the optical signal, for gauging the dimension and means for controlling the tool by reference to the gauged dimension and the desired dimension.

---

The present invention relates to machine tools.

Several systems for the numerical control of machine tools have appeared in recent years. Such systems have had various disadvantages. They have provided for the control of motion of a cutter or other tool by reference to some standard within the machine (such as a screw or scale) and the requirement (specified on, for example, a punched tape) but the shape of the workpiece has in general never been continuously monitored for comparison with the requirement. In other words previous systems have not had closed servo loops including the monitored shape of the workpiece. This leads to inevitable inaccuracies in the finished product.

It is an object of the invention to provide a true closed-loop machine tool control system, that is, a system having a servo loop closed on the monitored dimensions of the workpiece.

The essential feature of closed-loop control as applied to machining is the continuous and automatic control of the cutting tool by servos driven from error signals derived from a continuous comparison of the required shape with the shape already cut. The system is fundamentally different from inprocess-gauging, numerical control and other operator aids which rely either on the intermittent attention of a skilled operator or on the mechanical rigidity of the machine tool for their ultimate accuracy. The performance capability of closed-loop control is also completely different.

The objects of the invention are to provide a machine tool having the following advantages compared with a conventional machine tool:

(1) Increased accuracy is obtainable,
(2) Scrap is reduced due to continuous control of cutting tool and the monitoring of the workpiece, and the elimination of operator errors,
(3) Each workpiece is automatically inspected during machining and the information can be readily extracted as an inspection record accompanying each article if required; gauging and inspection as usually practised are almost eliminated, thereby saving manpower,
(4) Surface finish may be improved, reducing or even eliminating the need for grinding,
(5) Setting-up time is reduced,
(6) Operator time is greatly reduced if full use is made of the automatic capability, even in small batch runs,
(7) Working life of the machine is increased because the control system automatically compensates for some wear in the machine.
(8) Errors due to tool wear are eliminated.

For production of a given article the comparison of costs using a conventional machine and a closed-loop controlled machine will depend mainly on the savings which arise from the above factors. The latter will need only a low performance, lower cost standard machine but to its cost must be added the cost of the control and measuring system. On this comparison alone there may be no net advantage in the use of closed-loop control, except when very close tolerances are required, but when the reduction in labour charges possible with the automatic capability and the automatic inspection are included there is likely to be a substantial saving in labour costs on small batch machining work.

Automation appears to have been solely associated with large batches up-to-date but the application of modern electronic techniques to the automatic closed-loop control of machine tools offers the possibility of extending its advantages to small batch production.

At any instant during a machining operation the cutting edge of the tool should be in a prescribed position relative to the workpiece. The performance of the machine, although influenced by many other factors mainly depends on the accuracy with which the correct relative position is established and maintained.

The required relative positions between tool and workpiece are usually set in on the basis of cartesian co-ordinates at the slideway controls and even in the best machines there are a great many factors contributing to the total error between these settings and the actual relative positions achieved, including oscillatory variations due to vibration and chatter.

Apart from the subsequent acceptance or rejection of the result by independent gauging, this is a completely open loop control system, and the precision that can be achieved on the best modern machine tools in spite of this is testimony to the very high standards of design and engineering embodied in such machines.

Genuine closed loop control involves continuously monitoring the relative position of workpiece and cutting tool and the use of this information to correct the position with a control mechanism of adequately fast response.

The ideal point at which to close the control loops would be at the contact between the cutting tool and workpiece. Assuming that this could be done, six measurements and six controls would be needed if all the causes of error in the basic machine are to be removed. Furthermore, the servos would need to respond effectively at frequencies up to at least 1,000 cycles per second.

This is clearly impracticable but closed loop control techniques might nevertheless be applied to specific low frequency errors, still relying on the rigidity of the machine to minimize vibration and the orthogonality of the slideways to define reference axes.

This can be done, for example, on cylindrical grinding machines by using an in-process gauge close to the grinding wheel which controls the in-feed and withdraws the wheel when the required diameter is reached. Also optical measurements may be used to set spindle stations on jig borers and whilst these are examples of true closed loop controls, which may develop into valuable methods, they both rely on very low rates of change in the dimensions being controlled (in the second case, to a zero rate of change in the dimensions being controlled). For this reason the delay which arises because the loop is not closed at the ideal point or because the measuring system has a low information rate, can be tolerated.

The requirements for closed loop control of a cutting process are very much more stringent because the dimensions of the workpiece may change at very high rates.

It is important to distinguish between a so-called in process gauge which checks the initial setting for a series of constant co-ordinates and thereafter relies on the accuracy of slideways, and closed loop control in which the co-ordinates are continuously monitored by a true in-process gauge and corrected as the cut proceeds.

According to the present invention there is provided a machine tool for the machining of a workpiece including a tool for performing an operation on the workpiece, means for continuously monitoring a dimension of the workpiece while the operation is being performed on it and at the part of the workpiece where the operation is being performed and means for controlling the position of the tool by reference to the monitored dimension.

By "machining" is meant any of the processes carried out by machine tools, such as cutting, drilling, grinding, milling, planing, shaping, slotting, etc.

Embodiments of the invention will be described by way of example with reference to the accompanying drawings, in which.

Figure 1:
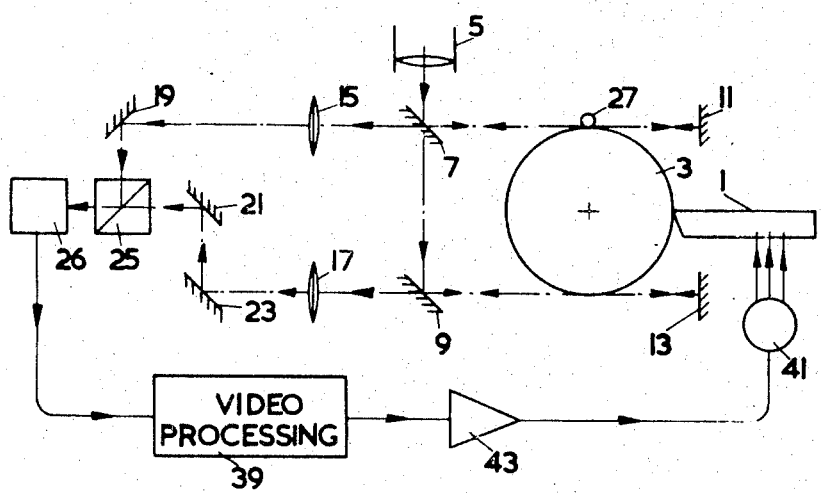
FIGURE 1 is a schematic diagram of a control system for a lathe.

FIGURE 1 is a schematic diagram of a control system for a lathe. A tool 1 is used to cut a workpiece 3. Light from a collimator 5 falls on two half-silvered mirrors 7, 9 whence it is reflected past the upper and lower edges of the workpiece 3. Two mirrors 11, 13 reflect the light back along the same path and through the half-silvered mirrors 7, 9 to a binocular microscope represented schematically by lenses 15, 17. Within the microscope mirrors 19, 21, 23 and a Swan cube 25 throw images of the workpiece 3 on the photocathode of a closed circuit television camera 26. A marker 27 adjacent to the upper edge of the workpiece 3 is fixed relative to the tool 1 and the uncut part of the workpiece 3.

Figure 2:
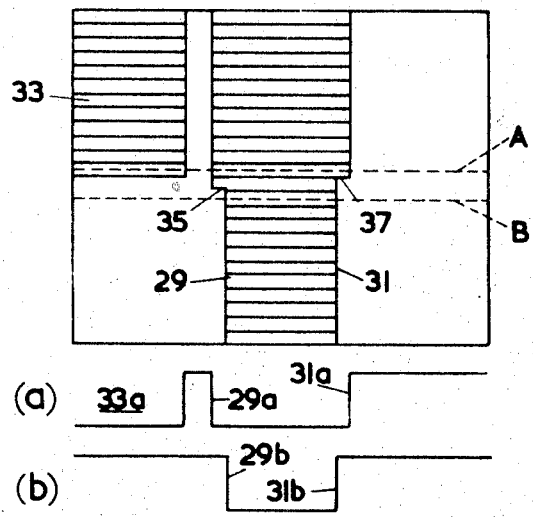
FIGURE 2 is a drawing of part of the control system of FIGURE 1, together with two waveforms occurring therein.

FIGURE 2 is a diagram of the image on the photocathode of the television camera 26. The image consists of two separate images of the edges of the workpiece 3, the upper edge being represented by an image 29 and the lower edge by an image 31. The marker 27 has an image 33. The images 35, 37 of the cuts made by the tool can be seen on the figure.

The television camera 26 may be connected to a closed circuit television monitor. By this means the edges of the workpiece can be individually inspected and because the images of the edges are magnified and presented close to one another irregularities and departures from parallelism may be observed more easily on the screen than on the workpiece.

FIGURE 2 includes two waveforms $a$ and $b$ which are video waveforms of two lines A and B respectively in the image. The line A is above the images 35, 37; that is to say, it is taken from the uncut part of the workpiece 3. The line B is below the images 35, 37; that is to say, it is taken from the cut part of the workpiece 3. In the waveform $a$ the dark portion 33$a$ from the image 33 of the marker 27 can be clearly seen. The images 29 and 31 appear as steps 29$a$ and 31$a$ respectively in the waveform $a$. In the waveform $b$ two steps 29$b$ and 31$b$ correspond to the images 29 and 31 respectively. The steps 29$b$ and 31$b$ are closer together than the steps 29$a$ and 31$a$ because the waveform $b$ is taken from a machined portion of the workpiece 3.

The true diameter $d_a$ of the workpiece at the section corresponding to the image A can be calculated from the waveform $a$. It is given by $$d_a = s + k\Delta t_a$$

where $s$ is the separation between the optical systems represented by the lenses 15, 17, $\Delta t_a$ is the time interval between the steps 29$a$ and 31$a$ in the waveform $a$ and $k$ is a constant of proportionality between time on the video waveform $a$ and distance on the workpiece. Similarly the true diameter $d_b$ of the workpiece at the section corresponding to the image B is given by $$d_b = s + k\Delta t_b$$

where $\Delta t_b$ is the time interval between the steps 29$b$ and 31$b$ in the waveform $b$.

The tool 1 in FIGURE 1 is controlled as follows. The video output of the camera 26 is applied to a video processing unit 39. Every frame scan of the camera will contain several video line traces similar to the waveforms $a$ and $b$ in FIGURE 2. At first the line traces will resemble the waveform $a$ in that they will start with black signals such as 33$a$ which are part of the image 33 of the marker 27. Eventually a line trace will occur which does not start with a black signal. This line trace is arranged to start a counter (not shown) which counts the next three line traces, preventing any line trace from being processed until the fourth, which will resemble the waveform $b$. In other words it will not start with black signal, and it will refer to the cut side of the workpiece 3. This fourth line trace will be referred to hereinafter as the trace $b$. The correct number of traces to be counted is that number that ensures that the diameter is measured at the point of the tool 1.

The time interval $\Delta t_b$ between the edges 29$b$ and 31$b$ of the trace $b$ is related to the true diameter $d_b$ of the workpiece 3 as stated above; hence the diameter it is required to machine the workpiece 3 to will have a corresponding required time interval $\Delta t_r$ given by $$\Delta t_r = (d_r - s)/k$$

where $d_r$ is the required diameter.

A monostable multivibrator (not shown) within the video processing unit 39 is arranged to reset itself after a time interval $\Delta t_r$. It is arranged to be set contemporaneously with the occurrence of the step 29$b$ of the trace $b$. Obviously if the diameter of the workpiece is absolutely correct then the multivibrator will reset itself at the instant of occurrence of the step 31$b$. The relative timing between the resetting of the multivibrator and the step 31$b$ produces an error signal which is applied to a motor 41 via an amplifier 43 (FIGURE 1). The error signal is used to control the motor 41 to move the tool 1 until the workpiece 3 is the required size.

Figure 3:
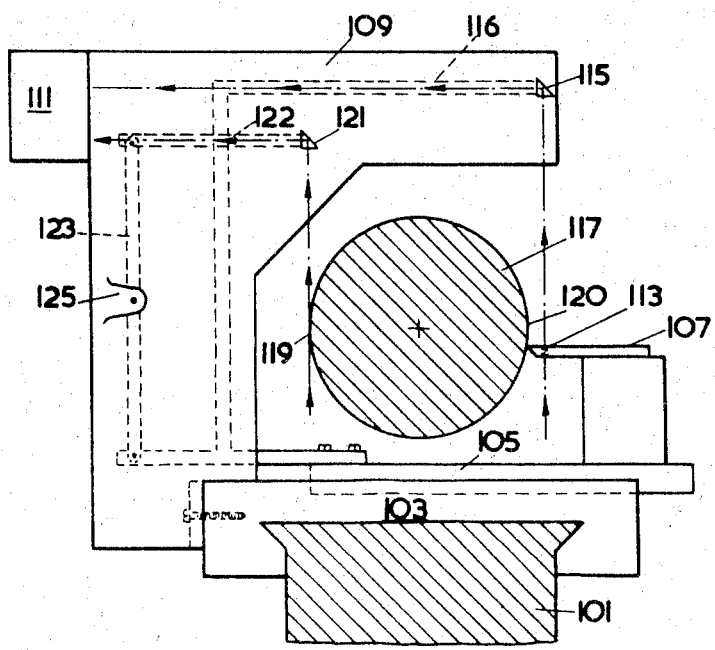
FIGURE 3 is a cross-sectional diagram of a different lathe embodying the invention.

FIGURE 3 is a cross-sectional diagram of a lathe embodying the invention. It may be thought of as similar to a FIGURE 1 type lathe with a variable distance between the optical systems represented by the lenses 15 and 17.

The lathe bed 101 supports a saddle 103 which carries a carriage 105. The carriage 105 carries a tool 107. Bolted to the saddle 103 is a measuring device 109, which carries a television camera 111. The tool 107 carries a marker here represented as a hole 113 through which light from a lamp (not shown in FIGURE 3) falls on a prism 115 to throw an image of the marker 113 on the photocathode of the television camera 111. The prism 115 is carried on a front carriage 116. The front carriage 116 is arranged to move with the tool 107 and in the diagram it is conventionally represented to do so.

The tool 107 is used to cut a workpiece 117. An image of the back edge 119 of the workpiece is thrown on the photocathode of the television camera 111 via a prism 121. The prism 121 is carried on a back carriage 122 which is arranged to move, relative to the measuring device 109, in opposition to the prism 115. The back carriage 122 is conventionally represented to execute its motion by an arm 123 carried by a pivot 125 attached to the measuring device 109.

The arrangement by which the tool 107 carries a marker such as the hole 113 and an image of the marker is thrown on the photocathode of the television camera 111 is a convenient one for monitoring the exact position of the tool. A more accurate assessment of the diameter of the workpiece may be obtained, however, by an image of the front edge 120 of the workpiece 117 being thrown on the photocathode instead. This image is treated in the same way as the image of the back edge 119 of the workpiece. When only the image of the edges 119 and 120 are monitored there is no direct control of the position of the tool 107. Direct control of the position of the tool 107 is necessary at the beginning of a cut and at other times and so the system may be made such that the image thrown is that of the marker 113 or the front edge 120 according to which is desired, and which image is thrown may be changed at convenient points in the programme.

Figure 4:
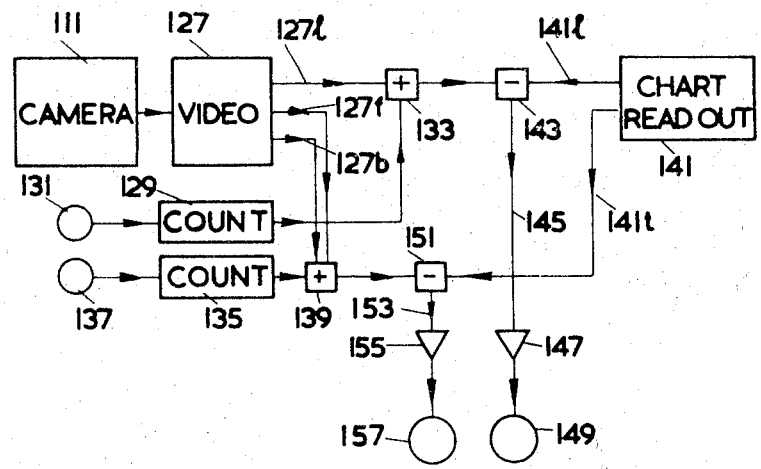
FIGURE 4 is a schematic diagram of a control system for the lathe of FIGURE 3.

FIGURE 4 is a schematic diagram of the automatic control system for the lathe. For making measurements transverse of the workpiece 117 of FIGURE 3 (for example the diameter of the workpiece 117) a line scale (not shown in FIGURE 3 or FIGURE 4) is used. This line scale (as is explained more fully below) is carried by the measuring device 109 and masked by two masks, one carried by the front carriage 116 and one carried by the back carriage 122. The number of whole lines between the masks is counted many times a second (as is explained below) and the fractions of a line at each end are measured at the camera 111. In comparison with FIGURE 1 the whole number of lines is similar to the distance $s$ between the optical systems represented by the lenses 15 and 17 and the fractions of a line are similar to the distance $k\Delta t_b$ corresponding to the time interval between the steps $29b$ and $31b$ in the waveform $b$ of FIGURE 2.

Similarly for making measurements along the workpiece 117 of FIGURE 3 a longitudinal line scale (not shown in FIGURE 3 or FIGURE 4) is used. This longitudinal line scale (as is explained more fully below) is fixed relative to the lathe bed 101 and masked by a mask carried by the measuring device 109. The number of whole lines from some datum point to the mask is counted many times a second (as is explained below) and the fraction of a line up to the position of the tool 107 of FIGURE 3 is measured at the camera 111 via an optical system also described below.

In FIGURE 4 the camera 111 is shown having a video output applied to a video processing unit 127. The video processing unit has three outputs $127l$, $127f$ and $127b$ representing, in digital form, the fractions of a line (mentioned above) measured at the position of the tool 107 on the longitudinal line scale, at the front edge of the workpiece 117 on the transverse line scale and at the back edge 119 of the workpiece 117 on the transverse line scale respectively.

The number of whole lines measured from the datum point (mentioned above) to the mask on the longitudinal line scale is counted by a counter 129 fed from a photocell (or series of photocells) 131 and is added to the fraction of a line (available from the output $127l$ of the video processing unit 127) in an adder 133. Similarly the number of whole lines measured between the marks on the transverse line scale is counted by a counter 135 fed from a photocell (or series of photocells) 137 and is added to the fractions of lines (available from the outputs $127f$ and $127b$ of the video processing unit 127) in an adder 139.

Thus the output of the adder 133 represents the true longitudinal position of the tool 107. The output of the adder 139 represents the true diameter (or whatever transverse measurement is being made) of the workpiece 117. When the transverse measurement is taken to the mark 113 on the tool 107 and not to the actual front edge 120 of the workpiece 117 means are provided for ensuring that the difference (which is constant) is compensated for in the video processing unit 127.

A chart readout unit 141 supplied with the requirement (specified on, for example, punched tape) to which the workpiece is to conform has an output $141l$ representing the required longitudinal position of the tool 107 and an output $141t$ representing the required diameter (or other transverse measurement).

The output of the adder 133 is compared with the output $141l$ of the chart read out unit 141 in a subtractor 143. The output of the subtractor 143 constitutes an error signal 145 which is amplified in an amplifier 147 and applied to a motor 149 which drives the lathe saddle 105 of FIGURE 3 to correct the longitudinal position of the tool 107.

Similarly the output of the adder 139 is compared with the output $141t$ of the chart readout unit 141 in a subtractor 151. The output of the subtractor 151 constitutes an error signal 153 which is amplified in an amplifier 155 and applied to a motor 157 which drives the carriage 105 of FIGURE 3 to correct the transverse position of the tool 107.

Figure 5:
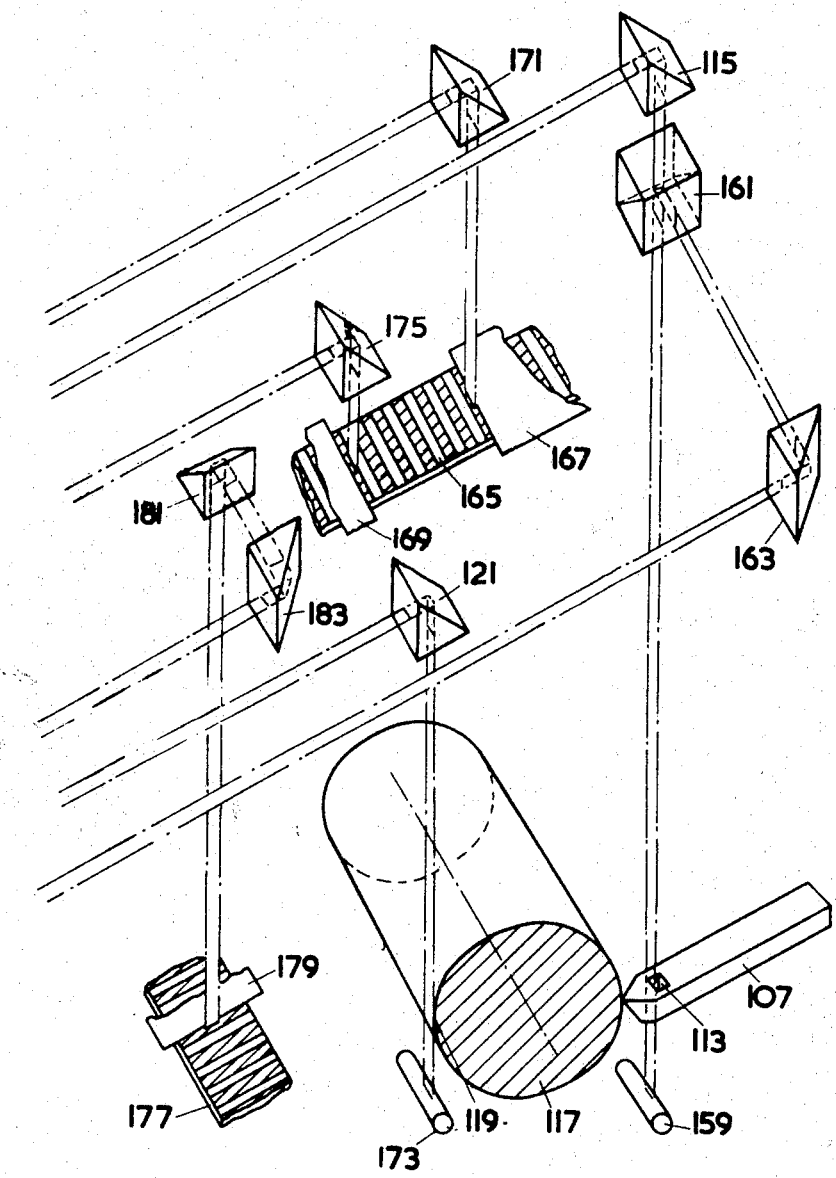
FIGURES 5, 6 and 7 are diagrams in greater detail of parts of the lathe of FIGURE 3.

FIGURE 5 is a diagram representing the arrangements for throwing the images on the photocathode of the television camera 111 of FIGURE 4.

The hole 113 in the tool 107 is illuminated by a lamp 159, and two images of it are thrown on the photocathode of the television camera 111. The first image (used for transverse measurements) is projected via a Swan cube 161 and the prism 115; the second image (used for longitudinal measurements) is projected via the Swan cube 161 and a prism 163. The Swan cube 161 and the prisms 115 and 163 are so arranged that the two images are at right-angles to one another in the plane of the photocathode.

At the same time an image of part of the transverse line scale 165 is projected. A mask 167 is carried by the front carriage 116 of FIGURE 3 and a mask 169 is carried by the back carriage 117 of FIGURE 3. An image of part of the line scale 165 in the region of the mask 167 is projected via a prism 171.

The Swan cube 161, the mask 167 and the prisms 115, 163 and 171 are all carried by the front carriage 116 of FIGURE 3 and the lamp 159 is fixed relative to the tool 107.

A lamp 173 projects an image of the back edge 119 of the workpiece 117 via a prism 121. An image of part of the line scale 165 in the region of the mask 169 is projected via a prism 175. The prisms 121 and 175 and the lamp 173 are fixed relative to one another.

The longitudinal line scale 177 is masked by a mask 179 carried by the measuring device 109. An image of the line scale 177 in the region of the mask 179 is projected via two prisms 181 and 183.

Figure 6:
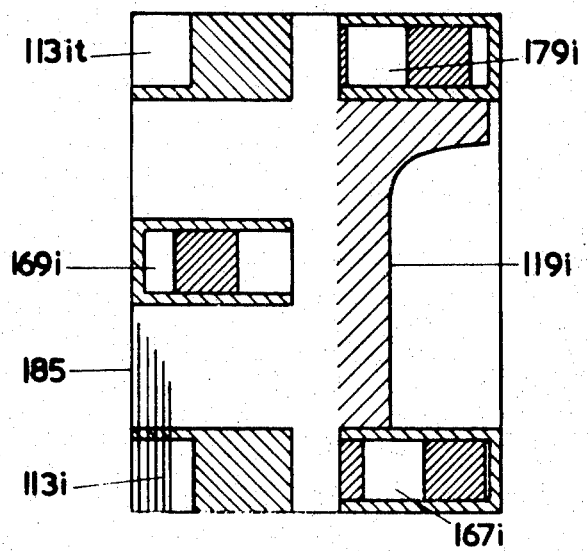

The images are arranged by a conventional optical system to fall on the photocathode of the television camera in the configuration shown in FIGURE 6.

FIGURE 6 is a diagram of the photocathode itself. The scanning direction is demonstrated by lines 185.

The image $113i$ of the tool marker 113 straight, i.e., via the prism 115, is in juxtaposition to the image $167i$ of the region of the line scale 165 in the region of mask 167. Similarly the image $169i$ of the line scale 165 in the region of the mask 169 is in juxtaposition to the image $119i$ of the back edge 119 of the workpiece 117 and the image $113it$ of the tool marker 113 turned, i.e., via the prism 163, is in juxtaposition to the image $179i$ of the line scale 177 in the region of the mask 179.

The dimensions of the workpiece are determined as follows. Let the distance on the photocathode (FIGURE 6) between a convenient edge on the image $113it$ and a convenient edge on the image $179i$ be L. Similarly let the distance between convenient edges of the images $169i$ and $119i$ be B and that between convenient edges of the images $113i$ and $167i$ be F. The distances L, B and F may be determined accurately by counting the number of scan lines, i.e., by gating the video output of the television camera 111 at suitable points in each scan. The distances L, B and F in the image correspond to real distances KL, KB and KF on the measuring machine 109, where K is a constant.

Then the length from the datum point to the tool 107 is given by $$KL + N_1/l$$

where $N_1$ is the number of lines counted from the datum point to the mask 179 and $l$ is the number of lines per unit distance on the scale 177.

Also the diameter of the workpiece 117 at the cutting point is given by $$KB + KF + N_d/l - \Delta$$

where $N_d$ is the number of lines counted on the line scale 165 between the mask 167 and 169, $l$ is the number of lines per inch on the scale 165 and $\Delta$ is the constant distance between the front edge of the workpiece 117 and the tool marker 113.

The two expressions given immediately above are calculated in the apparatus described with reference to FIGURE 4. Similar expressions apply to the case where an image of the front edge 120 of the workpiece 117 is thrown on the photocathode instead of an image of the marker 113. The quantities $N_1$, $N_d$ are counted as described below with reference to FIGURE 7.

Figure 7:
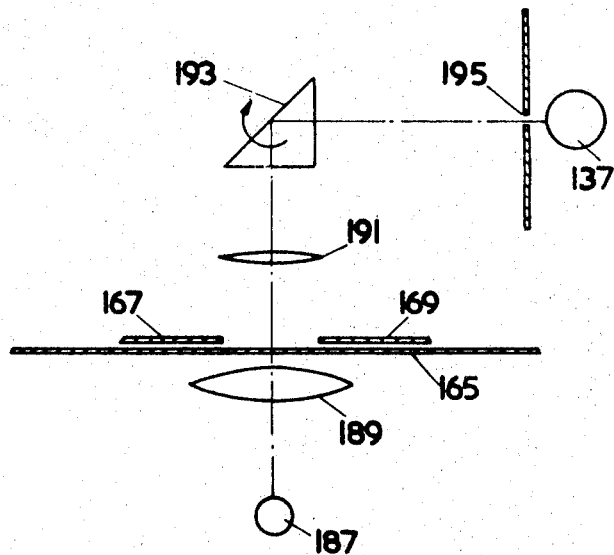

FIGURE 7 is a diagram of an arrangement for counting lines on a line scale. The line scale 165 between the masks 167 and 169 is illuminated by a lamp 187 via a condenser lens 189. A lens 191 in combination with a prism 193 throws an image of the line scale on a slit 195. The prism 193 is rapidly rotated about an axis perpendicular to the sheet on which the diagram is drawn so that a series of pulses of light equal to the number $N_d$ of lines passes through the slit 195. These pulses are received by the photocell 137 of FIGURE 4.

The number $N_1$ of lines on the longitudinal line scale 177 is counted similarly.

An alternative method of measuring distances both longitudinal and transverse of the workpiece 117 is described in the specification of United Kingdom patent application No. 48,567/65.

I claim:

1. A machine tool for the machining of a workpiece including a tool for performing an operation on the workpiece, means for continuously monitoring a dimension of said workpiece while said operation is being performed on it and at the part of the workpiece where said operation is being performed and means for controlling the position of said tool by reference to said monitored dimension, in which said means for continuously monitoring a dimension of the workpiece includes marker means, scale means which in conjunction with said marker means defines a measurement on said scale means corresponding at least approximately to said dimension, means for illuminating an edge of said workpiece, a screen, means for throwing an image of said edge upon said screen and means for thereby determining a correction to be applied to said measurement on said scale means in order to make it correspond more exactly to said dimension.

2. A machine tool as claimed in claim 1 and in which said screen is electronically scanned and the said correction is determined with reference to the electronic scan.

3. A machine tool as claimed in claim 2 and in which said screen is the photocathode of a television camera.

4. A machine tool as claimed in claim 1 and in which said scale means includes an optical line scale.

5. A machine tool as claimed in claim 4 and in which said optical line scale is a linear line scale.

6. A machine tool for the machining of a workpiece including a tool for performing an operation on the workpiece, means for continuously monitoring a dimension of said workpiece while said operation is being performed on it and at the part of the workpiece where said operation is being performed, means for controlling the position of said tool by reference to said monitored dimension and means for continuously gauging at least one co-ordinate of the position of said tool which includes a mark fixed relative to said tool, means for illuminating said mark and means for throwing an image of said mark upon a screen.

7. A machine tool as claimed in claim 6 and in which said screen is electronically scanned.

8. A machine tool as claimed in claim 7 and in which said screen is the photocathode of a television camera.

9. A machine tool as claimed in claim 6 and including marker means and scale means which in conjunction with said marker means defines a measurement on said scale means corresponding at least approximately to said co-ordinate.

10. A machine tool as claimed in claim 9 and further including means for determining by reference to the image of said mark on said screen a correction to be applied to the measurement on said scale means in order to make it correspond more exactly to said co-ordinate.

11. A machine tool as claimed in claim 10 and in which said screen is electronically scanned and said correction is determined with reference to the electronic scan.

12. A machine tool as claimed in claim 11 and in which said screen is the photocathode of a television camera.

13. A machine tool as claimed in claim 9 and in which said scale means includes an optical line scale.

14. A machine tool as claimed in claim 13 and in which said optical line scale is a linear line scale.

References Cited

UNITED STATES PATENTS

| | | | |
|---|---|---|---|
| 2,372,427 | 3/1945 | Johnson | 82—14.4 |
| 2,374,365 | 4/1945 | McNeill et al. | 82—14.4 |
| 2,632,956 | 3/1953 | Crosby | 82—14.4 |
| 2,831,387 | 4/1958 | Ovshinsky | 82—14.4 |
| 2,955,155 | 10/1960 | Mayer | 90—13.99 |
| 3,040,221 | 6/1962 | Fitzner | 90—13.99 |
| 3,187,247 | 6/1965 | Colten et al. | 90—13.99 |
| 3,269,233 | 8/1966 | Lothmann | 90—13.99 |
| 3,301,105 | 1/1967 | Morris | 82—14 |

FOREIGN PATENTS

| | | |
|---|---|---|
| 802,206 | 10/1958 | Great Britain. |

GERALD A. DOST, *Primary Examiner.*

U.S. Cl. X.R.

33—180; 90—13